United States Patent
Shin et al.

(10) Patent No.: US 8,480,994 B2
(45) Date of Patent: Jul. 9, 2013

(54) METHOD OF MODIFYING CARBON NANOTUBE USING RADICAL INITIATOR, AND DISPERSION LIQUID AND ELECTRODE COMPRISING THE CARBON NANOTUBE MODIFIED BY USING THE METHOD

(75) Inventors: Hyeon-jin Shin, Yongin-si (KR); Jae-young Choi, Yongin-si (KR); Seong-jae Choi, Yongin-si (KR); Seon-mi Yoon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 558 days.

(21) Appl. No.: 12/026,081

(22) Filed: Feb. 5, 2008

(65) Prior Publication Data
US 2008/0296539 A1    Dec. 4, 2008

(30) Foreign Application Priority Data

May 29, 2007    (KR) .................. 10-2007-0052218

(51) Int. Cl.
*H01B 1/04* (2006.01)
*C09C 1/44* (2006.01)

(52) U.S. Cl.
USPC ........ 423/447.1; 252/500; 252/502; 252/511; 423/460; 977/742; 977/745; 977/845

(58) Field of Classification Search
USPC ..... 252/500–518.1; 423/460, 447.1; 977/742, 977/745, 845
See application file for complete search history.

(56) References Cited

U.S. PATENT DOCUMENTS

| 2006/0045838 | A1 | 3/2006 | Lucien Malenfant et al. |
| 2007/0065975 | A1* | 3/2007 | Smalley et al. ................. 438/99 |
| 2007/0099792 | A1* | 5/2007 | Khabashesku et al. ...... 501/95.3 |
| 2007/0280876 | A1* | 12/2007 | Tour et al. ..................... 423/460 |
| 2008/0063587 | A1* | 3/2008 | Strano et al. ............... 423/447.1 |
| 2008/0262160 | A1* | 10/2008 | Du Prez et al. ............... 525/228 |

FOREIGN PATENT DOCUMENTS

| WO | 2005/113434 | 12/2005 |
| WO | WO2006/116547 | * 11/2006 |

OTHER PUBLICATIONS

Stephenson et al. "Individualized Single Walled Carbon Nanotubes from Bulk Material Using 96% Sulfuric Acid as Solvent" Chem. Mater. vol. 18, pp. 374-377, web pub Dec. 22 2005.*
Wu et al. "Poly(N-vinyl carbazole)-grafted multiwalled carbon nanotubes: Synthesis via direct free radical reaction and optical limiting properties" Appl Surface Science, vol. 253, pp. 5122-5128, online Dec. 18, 2006.*
Kitano et al. "Interactions between polymer chains covalently fixed to single-walled carbon nanotubes." Macromolecul Chem. and Phys., vol. 207, pp. 812-819, 2006.*
Kulakova "Surface chemistry of nanodiamonds." Physics of the solid state, 46(4), pp. 621-628, 2004.*
Xianbao Wang et al., Radical functionalization of single-walled carbon nanotubes with azo (bisisobutyronitrile), Applied Surface Science 253 (2007) pp. 7435-7437 (Mar. 30, 2007).

* cited by examiner

*Primary Examiner* — Tri V Nguyen
(74) *Attorney, Agent, or Firm* — Cantor Colburn LLP

(57) ABSTRACT

Provided is a method of modifying carbon nanotubes, the method including: preparing a mixed solution in which a radical initiator and a carbon nanotube are dispersed; applying energy to the mixed solution to decompose the radical initiator into a radical; and reacting the decomposed radical with a surface of the carbon nanotube, wherein the radical which has reacted with the carbon nanotube is detached from the carbon nanotube after the reaction with the carbon nanotube. In the method of modifying carbon nanotube, a radical is reacted with a carbon nanotube and then separated from the carbon nanotube to thus modify the surface of the carbon nanotube without chemical bonding. Accordingly, the conductivity of the carbon nanotube can be increased.

4 Claims, 3 Drawing Sheets

METHOD OF MODIFYING CARBON NANOTUBE USING RADICAL INITIATOR, AND DISPERSION LIQUID AND ELECTRODE COMPRISING THE CARBON NANOTUBE MODIFIED BY USING THE METHOD

CROSS-REFERENCE TO RELATED PATENT APPLICATION

This application claims the benefit of Korean Patent Application No. 10-2007-0052218, filed on May 29, 2007, in the Korean Intellectual Property Office, the disclosure of which is incorporated herein in its entirety by reference.

BACKGROUND OF THE INVENTION

1. Field of the Invention

The present invention relates to a method of modifying carbon nanotubes using a radical initiator, and a dispersion liquid and an electrode comprising the carbon nanotube modified by using the method, and more particularly, to a method of modifying a surface of a carbon nanotube by reacting a radical initiator with the carbon nanotube, wherein the radical has reacted with the carbon nanotube is detached from the carbon nanotube after the reaction with the carbon nanotube, and a dispersion liquid and an electrode comprising the carbon nanotube modified by using the method.

2. Description of the Related Art

Carbon nanotubes (CNTs) are carbon structures in which carbon atoms are arranged in a hexagonal and honeycomb-like structure, thus taking the form of tubes. CNTs are very anisotropic, and have various structures such as a single wall structure, a multi-wall structure, a structure including bundles, and the like. CNTs are nanometer-scale structures having nanometer-scale diameters (nm=1 to 1 billion meter). CNTs have excellent mechanical properties, high electrical selectivity, excellent field emission properties, highly efficient hydrogen storage medium properties, and the like.

In addition, CNTs behave like semiconductors or metals according to the pattern in which carbon atoms are arranged in the hexagonal and honeycomb-like structure. An energy gap depends on the diameter of each CNT, and CNTs have quasi-one dimensional electronic structure so that they have particular quantum properties.

Examples of methods of preparing CNTs include arc discharge, pyrolysis, laser deposition, plasma enhanced chemical vapor deposition (PECVD), thermal chemical vapor deposition, electrolysis, and the like.

CNTs have high electrical conductivity, thus are used in the formation of a conductive layer, and the like. In addition, in the future, there is high possibility of the use of CNTs in a variety of functional complexes such as a probe, and the like of field emission displays (FEDs) and scanning probe microscopes (SPMs). Therefore, research on such uses of CNTs has been actively conducted.

CNTs prepared by the conventional method are mixtures of metallic CNT and semiconducting CNT, and property of the CNTs depends on their structures and optical chiralities. However, to be used as an electrode material, or the like, CNTs have to have increased conductivity. Therefore, methods of separating only CNTs having metallic properties, increasing an amount of CNTs having metallic properties in CNTs, or the like are required.

As an example of such a method, U.S. Patent Publication No. 20060045838 discloses a method of separating metallic CNTs and non-metallic CNTs using a dispersant.

However, this method using separation has problems in that the separation is not completely successful, and the separation procedures are complicated.

Accordingly, to address those problems in the art, a method of simply modifying a surface of a carbon nanotube is required.

SUMMARY OF THE INVENTION

The present invention provides a method of modifying carbon nanotubes.

The present invention also provides a dispersion liquid comprising a carbon nanotube modified by using the method.

The present invention also provides a display electrode comprising a carbon nanotube modified by using the method.

According to an aspect of the present invention, there is provided a method of modifying carbon nanotubes, comprising: preparing a mixed solution in which a radical initiator and a carbon nanotube are dispersed; applying energy to the mixed solution to decompose the radical initiator into a radical; and reacting the decomposed radical with a surface of the carbon nanotube, wherein the radical which has reacted with the carbon nanotube is detached from the carbon nanotube after the reaction with the carbon nanotube.

According to another aspect of the present invention, there is provided a carbon nanotube dispersion liquid comprising: a carbon nanotube modified by using the method; a dispersant; and a dispersion solvent selected from an organic solvent, water, or a mixture thereof.

According to another aspect of the present invention, there is provided a display electrode comprising a carbon nanotube modified by using the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
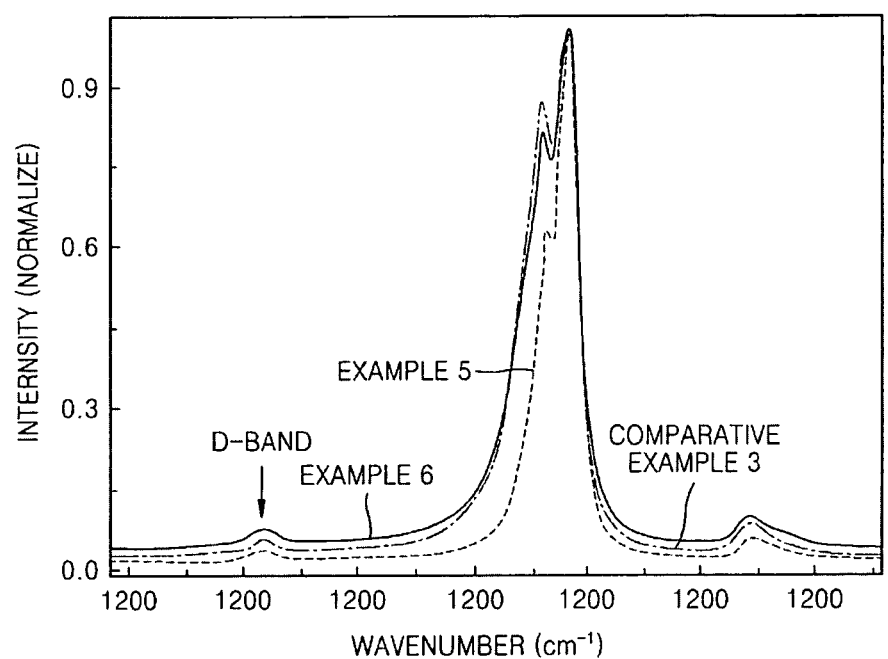
FIGS. 1 through 3 are Raman Spectra results of carbon nanotubes of Examples 5 and 6 and Comparative Example 3, respectively.

The present invention will now be described more fully with reference to the accompanying drawings, in which exemplary embodiments of the invention are shown.

The present invention provides a method of modifying carbon nanotubes. Unlike conventional methods of modifying carbon nanotubes, wherein a radical forms a bond with the surface of a metallic carbon nanotube, in the method according to the present invention, a radical which has reacted with a carbon nanotube is detached from the carbon nanotube to thus increase conductivity of the carbon nanotube.

The method of modifying carbon nanotubes includes: preparing a mixed solution in which a radical initiator and a carbon nanotube are dispersed; applying energy to the mixed solution to decompose the radical initiator into a radical; and reacting the decomposed radical with a surface of the carbon nanotube, wherein the radical which has reacted with the carbon nanotube is detached from the carbon nanotube after the reaction with the carbon nanotube. A reason of an increase in the conductivity of the carbon nanotube by using the method of modifying carbon nanotubes will now be more particularly described. The description is only to aid in the understanding of the present invention, and the present invention is not limited thereby.

When a radical of a predetermined functional group is reacted with a carbon nanotube to form a bond between the carbon nanotube and the predetermined functional group, an sp2 orbital of carbon existing on the surface of the carbon nanotube is changed to an sp3 orbital. In this case, resonance that enables delocalization of electrons breaks, and thus the conductivity of the carbon nanotube is reduced.

Unlike this, in the method according to the present invention, the radical which has reacted with the carbon nanotube is detached from the carbon nanotube after the reaction with the carbon nanotube. Thus, the sp3 orbital is not formed. Further, defects such as a dangling bond of the sp3 orbital existing on the surface of the carbon nanotube, or the like is removed by the radical. Therefore, by the removal of the defects, the sp2 orbital is formed so that the conductivity of the carbon nanotube can be improved.

In the preparing of the mixed solution in which a radical initiator and a carbon nanotube are dispersed, the dispersion is generally performed using a sonicator. Next, in the applying of energy to the mixed solution to decompose the radical initiator into a radical, the decomposition is performed by applying energy such as heat, ultraviolet rays, ultrasonic waves, or the like to the mixed solution. Next, the operation of reacting the decomposed radical with the surface of the carbon nanotube is performed, followed by the operation of reacting the radical with the carbon nanotube, wherein the radical which has reacted with carbon nanotube is detached from the carbon nanotube after the reaction with the carbon nanotube.

The method of modifying carbon nanotubes may further include: separating the carbon nanotube using centrifugation after the reaction described above is terminated; washing the carbon nanotube several times using a solvent to remove the radical initiator; redispersing the washed carbon nanotube; and separating a dispersed supernatant.

The radical initiator used herein may be a halogen compound, an azo compound, a peroxide compound excluding acyl peroxide, or the like.

The halogen compound may be N-bromo succinimide, $F_2$, $Cl_2$, $Br_2$, $I_2$, or the like.

The azo compound may be a compound represented by Formula 1 below:

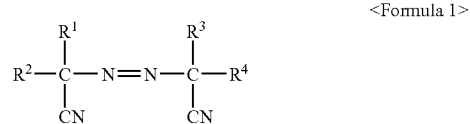

<Formula 1> wherein $R_1$, $R_2$, $R_3$ and $R_4$ are each independently a $C_{1-9}$ alkyl group, a $C_{1-9}$ alicyclic group or a $C_{1-9}$ alkylalicyclic group, and $R_1$ and $R_2$ can be bound to each other to form a $C_{5-8}$ hydrocarbon ring, and $R_3$ and $R_4$ can be bound to each other to form a $C_{5-8}$ hydrocarbon ring.

More particularly, the azo compound may be azobisisobutyronitrile (AIBN), 1,1-azobis(cyclohexane carbonitrile) (ABCN), or the like.

In addition, the peroxide compound may be a peroxide compound having 1-20 carbon atoms. Examples of the peroxide compound include peroxydicarbonate, peroxyester, oo-t-alkyl-o-alkylmonoperoxycarbonate, diperoxyketal, dialkylperoxide, hydroperoxide and ketone peroxide. As described above, the acyl peroxide compounds are excluded because they are reacted with the carbon nanotube to form a bond with the carbon nanotube.

More particularly, examples of the peroxide compound include methyl ethyl ketone peroxide, acetone peroxide, t-butylbenzoate, t-butylperacetate, t-amyl perbenzoate, 2,5-di(benzoylperoxy)-2,5-dimethylhexane, t-butyl peroxyisobutyrate, t-butyl peroxy-2-ethylhexanoate (t-butyl peroctoate), t-amyl peroctoate, 2,5-di(2-ethylhexanoylperoxy)-2,5-dimethylhexane, t-butyl peroxypivalate, t-amyl peroxypivalate, t-butyl peroxyneodecanoate, t-amyl peroxyneodecanoate, α-cumyl peroxyneodecanoate, ethyl 3,3-di(t-butylperoxy)butyrate, ethyl 3,3-di(t-amylperoxy)butyrate, n-butyl 4,4-di(t-butylperoxy)valerate, 2,2-di(t-butylperoxy)butane, 1,1-di(t-butylperoxy)cyclohexane, 1,1-di(t-butylperoxy)3,3,5-trimethylcyclohexane, 1,1-di(t-amylperoxy)cyclohexane, 2,5-di(t-butylperoxy)-2,5-dimethyl-3-hexyne, di-t-butyl peroxide, t-butyl α-cumyl peroxide, 2,5-di(t-butylperoxy)-2,5-dimethylhexane, di-n-propyl peroxydicarbonate, diisopropyl peroxydicarbonate, dicetyl peroxydicarbonate, di-sec-butyl peroxydicarbonate, t-butyl hydroperoxide, t-amyl hydroperoxide, cumen hydroperoxide, pinane hydroperoxide, paramethane hydroperoxide and the like.

The present invention also provides a dispersion liquid including: the carbon nanotube modified by the method of the present invention; a dispersant; and dispersion medium selected from an organic solvent, water, or a mixture thereof. The dispersion medium used in the dispersion liquid may be a solvent selected from an organic solvent, water, or a mixture thereof, but is not limited thereto.

More particularly, examples of the organic solvent include: alcohols such as methylalcohol, ethylalcohol, n-propylalcohol, isopropylalcohol, n-butylalcohol, sec-butylalcohol, t-butylalcohol, isobutylalcohol and diacetonealcohol; glycols such as ethyleneglycol, diethyleneglycol, triethyleneglycol, propyleneglycol butyleneglycol, hexyleneglycol, 1,3-propandiol, 1,4-butanediol, 1,2,4-butanetriol, 1,5-pentanediol, 1,2-hexanediol and 1,6-hexanediol; glycol ethers such as ethyleneglycol monomethyl ether and triethyleneglycol monoethyl ether; glycol ether acetates such as propylene glycol monomethyl ether acetate (PGMEA); terpineols; trimethyl pentanediol monoisobutyrat (TEXANOL); dibromoethane; dichloroethane (DCE); nitrogen compounds such as halogen compounds, chloroform, dichloroethane, dichlorobenzene, idobenzene, nitrobethane, nitroethane, and the like; cyanocompounds such as acetonitrile, benzonitrile, and the like; amides such as 1-methylpyrrolidone (NMP), dimethylformamide, and the like; and the like, and the organic solvent can be used alone or in combination.

The dispersion liquid may include 0.01-1 wt % of a dispersant; 0.01-0.1 wt % of modified carbon nanotube; and the remaining amount of a dispersion medium, based on 100 wt % of the mixed solution.

In addition, a mixing weight ratio of the modified carbon nanotube to the dispersant in the mixed solution may be in the range of 1:1 to 1:10. When the amount of the dispersant is below the range of the mixing weight ratio, an appropriate dispersion effect of the carbon nanotube can not be obtained. When the amount of the dispersant is above the range of the mixing weight ratio, a rather bad dispersion effect can result due to the viscosity of the dispersant itself.

The carbon nanotube used in the dispersion liquid may be a single-walled carbon nanotube, a double-walled carbon nanotube, a multi-walled carbon nanotube, a carbon nanotube bundle, or the like, but is not limited thereto. The carbon nanotube can be any kind of carbon nanotube used in the art.

The dispersion liquid may further include an organic binder, a photosensitive monomer, a photo initiator, a viscosity modifier, a storage stabilizer, a wetting agent, acid or base, and the like, as long as it achieves the objective of the present invention.

The viscosity modifier and the storage stabilizer can be any materials that are conventionally used in the art. Examples of the viscosity modifier include casein, carboxymethylcellulose and the like.

In addition, the wetting agent can be any material that is conventionally used in the art. The wetting agent can be polyhydric alcohols such as glycerin, ethylene glycol, diethylene glycol, triethylene glycol, propylene glycol, dipropylene glycol, 1,3-butanediol, 1,4-butanediol, 1,5-pentanediol, 1,2-hexanediol, 2-methyl-2-pentanediol, or the like.

The dispersion liquid may further include acid or base. The acid or base increases solubility of the dispersant with respect to water and a polar solvent, and provides dispersed carbon nanotube particles with electrostatic repulsion thus to stabilize dispersion state of the carbon nanotube. Examples of the acid include hydrochloric acid, sulfuric acid, nitric acid, acetic acid, carbonic acid, and the like. Examples of the base include sodium hydroxide, potassium hydroxide, calcium hydroxide, ammonium hydroxide, and the like.

The dispersion liquid having such a configuration as described above can be used in any kind of industrial field that can use a water-based or solvent-based carbon nanotube composition. In particular, the dispersion liquid can be used in the fabrication of a field emitter of a field emission display (FED), carbon nanotube ink, printable carbon nanotubes, and the like.

The present invention also provides a display electrode including the carbon nanotube modified by using the method of present invention.

The carbon nanotube modified by using the method of modifying a carbon nanotube, according to the present invention can be coated as a thin film in display devices, and thus can be used as a display electrode.

Hereinafter, the present invention will be described more specifically with reference to the following examples. The following examples are only for illustrative purposes and are not intended to limit the scope of the invention.

Modification of Carbon Nanotube

EXAMPLE 1

4 mg of arc-carbon nanotube (arc-CNT, Asp-100F obtained from Iljin Nanotech Co.) and 80 mg of azobisisobutyronitrile were added to 10 g of dibromoethane. While the temperature of the mixed solution was maintained at 80° C., the mixture was dispersed for 10 hours after a sonicator was capped.

After dispersion, the carbon nanotube precipitated at the bottom was separated through centrifugation (10000 rpm, 10 minutes), and washed with dichloroethane three times. Next, 4 mg of the washed carbon nanotube was added to 40 ml of dichloroethane, and the mixture was dispersed using a sonicator for 10 hours.

After dispersion, only a dispersed supernatant was separated through centrifugation (10000 rpm, 10 minutes) to obtain a modified carbon nanotube dispersion liquid.

EXAMPLE 2

A modified carbon nanotube dispersion liquid was prepared in the same manner as in Example 1, except that 80 mg of N-bromosuccinimide was used instead of 80 mg of azobisisobutyronitrile.

COMPARATIVE EXAMPLE 1

A modified carbon nanotube dispersion liquid was prepared in the same manner as in Example 1, except that a radical initiator was not used.

Measurement of Surface Resistance

Absorbances of the dispersion liquids prepared in Examples 1 and 2 and Comparative Example 1 were measured at 550 nm, and then concentrations thereof were equally revised based the measured absorbances.

Next, to measure surface resistance, bucky paper was prepared using 0.1 μm of Anodisc 47 made of $Al_2O_3$, obtained from Whatman Co.

The bucky paper was prepared by vacuum filtering the dispersion liquids prepared in Examples 1 and 2 and Comparative Example 1 using the paper of Whatman Co.

A surface resistance of the prepared bucky paper was measured by 4-probe measurement using CMT-SR2000N (Advanced Instrument Technology Co.).

The results are shown in Table 1 below. Examples 3 and 4 and Comparative Example 2 shown in Table 1 represent bucky paper that was prepared in Examples 1 and 2 and Comparative Example 2, respectively.

TABLE 1

| | Surface resistance [Ω/sq.] | Resistance reduction ratio [%] |
|---|---|---|
| Example 3 | 36.79 | 68.04 |
| Example 4 | 87.75 | 23.76 |
| Comparative Example 2 | 115.10 | — |

As shown in Table 1, the surface resistances of the bucky paper prepared in Examples 3 and 4 are reduced by about 20-70%, compared with that of the bucky paper prepared in Comparative Example 2. That is, in the case of carbon nanotubes modified using a radical initiator, the conductivity is increased by about 20-70% compared to the case of carbon nanotubes that are not modified using a radical initiator.

Measurement of Raman Spectrum

Raman spectra of carbon nanotubes separated from the dispersion liquids prepared in Examples 1 and 2 and Comparative Example 1 were respectively measured.

Figure 2:
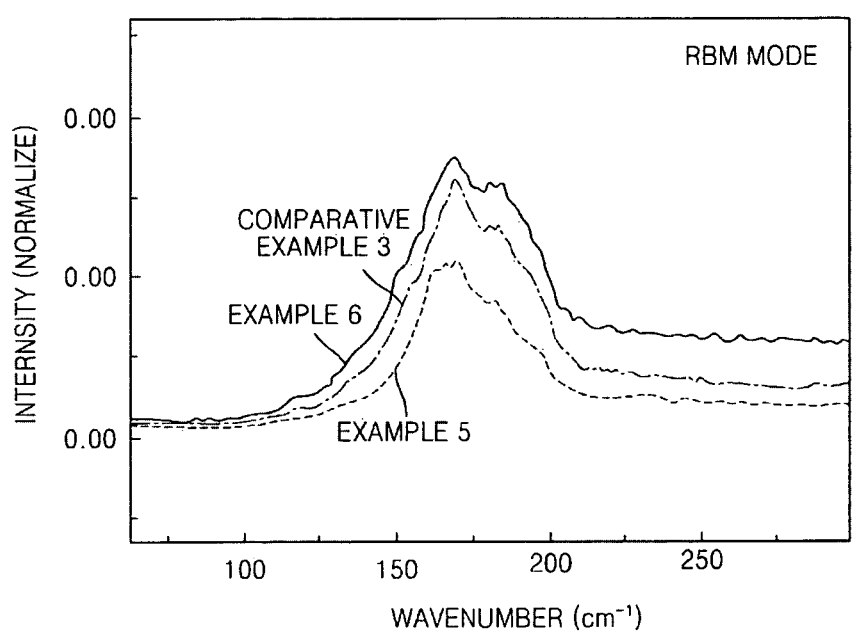
Figure 3:
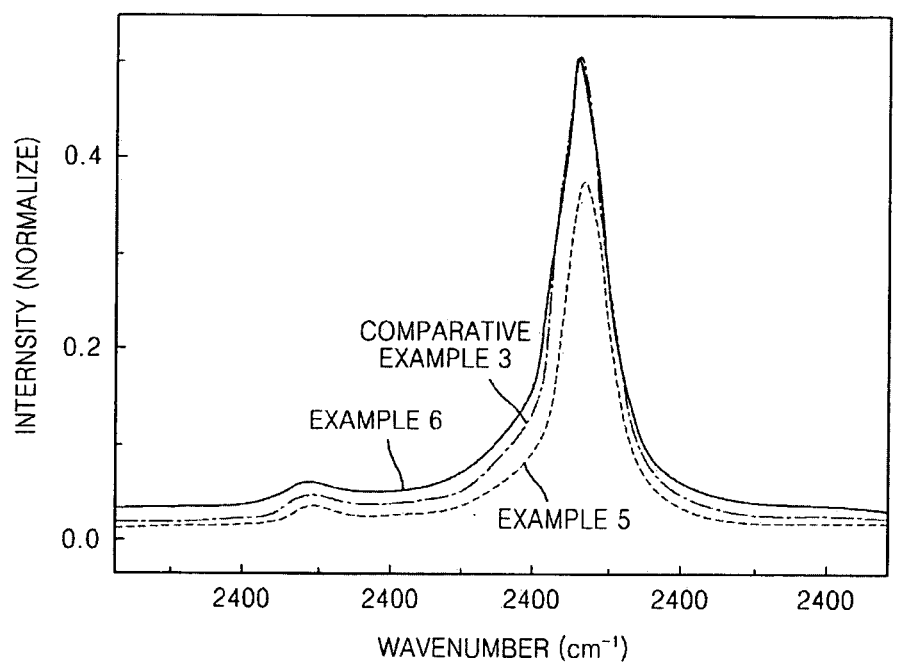

The measurement results are shown in FIGS. 1 through 3.

In FIGS. 1 through 3, Examples 5 and 6 and Comparative Example 3 represent carbon nanotubes separated from the dispersion liquids prepared in Examples 1 and 2 and Comparative Example 2.

As shown in FIG. 1, in the case of all of Examples 5 and 6 and Comparative Example 3, there is no change in the D-band. The result shows that although a radical initiator is used, a chemical bond related to the sp3 orbital was not formed on the surface of the carbon nanotube.

In addition, as shown in FIGS. 2 and 3, a peak magnitude of a radial breathing mode (RBM) is reduced, and the width of the G-band is reduced. Therefore, this shows that the surface of the carbon nanotube was modified by a radical.

From these results, it can be seen that when the method of modifying carbon nanotube, according to the present invention is used, the conductivity of the carbon nanotube can be improved by modifying the surface of the carbon nanotube without forming a chemical bond on the surface of the carbon nanotube.

According to the method of modifying carbon nanotube, a radical is reacted with a carbon nanotube and then separated from the carbon nanotube thus to modify the surface of the carbon nanotube without a chemical bonding. Accordingly, the conductivity of the carbon nanotube can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of modifying carbon nanotubes, comprising:
preparing a mixed solution consisting essentially of a radical initiator and a carbon nanotubes in which a radical initiator and a carbon nanotube are dispersed;
applying energy to the mixed solution to decompose the radical initiator into a radical; and
modifying the carbon nanotube by reacting the decomposed radical with a surface of the carbon nanotube,
washing the carbon nanotubes after the reacting of the decomposed radical with the surface of the carbon nanotube;
wherein the radical which has reacted with the carbon nanotube is detached from the carbon nanotube after the reaction with the carbon nanotube,
wherein a surface of the modified carbon nanotube has no chemical bond having a sp3 orbital thereon after the radical has been detached from the carbon nanotube,
wherein the radical initiator comprises an azo compound,
wherein the azo compound is a compound represented by Formula 1 below:

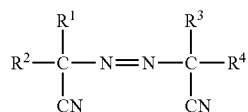

<Formula 1> wherein $R_1$, $R_2$, $R_3$ and $R_4$ are each independently a $C_{1-9}$ alkyl group, a $C_{1-9}$ alicyclic group or a $C_{1-9}$ alkylalicyclic group, and $R_1$ and $R_2$ can be bound to each other to form a $C_{5-8}$ hydrocarbon ring and $R_3$ and $R_4$ can be bound to each other to form a $C_{5-8}$ hydrocarbon ring.

2. The method of claim 1, wherein the energy is in the form of heat, ultraviolet rays, or ultrasonic waves.

3. The method of claim 1, wherein the azo compound comprises azobisisobutyronitrile, or 1,1-azobis(cyclohexane carbonitrile).

4. A method of modifying carbon nanotubes, comprising:
preparing a mixed solution consisting essentially of a radical initiator and a carbon nanotubes in which a radical initiator and a carbon nanotube are dispersed;
applying energy to the mixed solution to decompose the radical initiator into a radical; and
modifying the carbon nanotube by reacting the decomposed radical with a surface of the carbon nanotube; and
separating the carbon nanotube from the mixed solution,
washing the carbon nanotubes after the separating the carbon nanotubes from the mixed solution;
wherein the radical which has reacted with the carbon nanotube is detached from the carbon nanotube after the reaction with the carbon nanotube,
wherein components of the mixed solution does not include a radical of a functional group which is reacted with the carbon nanotube to form a bond between the carbon nanotube and the functional group,
wherein the radical initiator comprises an azo compound, wherein the azo compound is a compound represented by Formula 1 below:

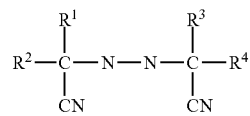

wherein $R_1$, $R_2$, $R_3$ and $R_4$ are each independently a $C_{1-9}$ alkyl group, a $C_{1-9}$ alicyclic group or a $C_{1-9}$ alkylalicyclic group, and $R_1$ and $R_2$ can be bound to each other to form a $C_{5-8}$ hydrocarbon ring and $R_3$ and $R_4$ can be bound to each other to form a $C_{5-8}$ hydrocarbon ring.

* * * * *